United States Patent
Fujimori

(10) Patent No.: US 7,826,479 B2
(45) Date of Patent: Nov. 2, 2010

(54) COMMUNICATION MESSAGE CONVERSION DEVICE, COMMUNICATION METHOD AND COMMUNICATION SYSTEM

(75) Inventor: Takashi Fujimori, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 990 days.

(21) Appl. No.: 11/125,136

(22) Filed: May 10, 2005

(65) Prior Publication Data

US 2005/0254518 A1 Nov. 17, 2005

(30) Foreign Application Priority Data

May 12, 2004 (JP) ............... 2004-141939

(51) Int. Cl.
*H04J 3/16* (2006.01)
*H04J 3/22* (2006.01)

(52) U.S. Cl. ..................................... 370/466
(58) Field of Classification Search ....................... None
See application file for complete search history.

(56) References Cited

U.S. PATENT DOCUMENTS 7,154,908 B1 * 12/2006 Emmerink et al. .......... 370/466
7,184,871 B2 * 2/2007 Horbaschek ................. 701/48
7,343,469 B1 * 3/2008 Bogin et al. ................. 711/209
2004/0076178 A1 * 4/2004 Botton ....................... 370/466

FOREIGN PATENT DOCUMENTS

| JP | 2003-111156 A | 4/2003 |
| JP | 2003-264567 A | 9/2003 |
| JP | 2003-264571 A | 9/2003 |
| WO | WO 01/45348 A2 | 6/2001 |

OTHER PUBLICATIONS

A. Both et al. "This is FlexRay—the Fast and Reliable In-Car LAN", Nikkei Electronics, Feb. 2, 2004.

* cited by examiner

*Primary Examiner*—Raj Jain
(74) *Attorney, Agent, or Firm*—Sughrue Mion, PLLC

(57) ABSTRACT

A communication message conversion device according to the present invention comprises a first receiving unit receiving a first message according to a first communication protocol, a first message storage unit storing the first message received by the first receiving unit in one of a plurality of buffer areas according to a first message identifier contained in the first message, a first identifier conversion unit converting the first message identifier contained in the first message stored in the first message storage unit into a second message identifier, a first message conversion unit packing a plurality of first messages converted with the first identifier conversion unit into a second message and a first transmission unit transmitting the second message converted with the first message conversion unit according to a second communication protocol.

14 Claims, 13 Drawing Sheets

CAN MESSAGE CONVERSION TABLE 324

| FlexRay MESSAGE TABLE 1 | FlexRay MESSAGE TABLE 2 | ... | FlexRay MESSAGE TABLE n |
|---|---|---|---|
| CAN BUFFER NUMBER / MESSAGE ID | CAN BUFFER NUMBER / MESSAGE ID | .. | CAN BUFFER NUMBER / MESSAGE ID |
| CAN BUFFER NUMBER / MESSAGE ID | CAN BUFFER NUMBER / MESSAGE ID | .. | CAN BUFFER NUMBER / MESSAGE ID |
| CAN BUFFER NUMBER / MESSAGE ID | CAN BUFFER NUMBER / MESSAGE ID | .. | CAN BUFFER NUMBER / MESSAGE ID |
| .. | .. | .. | .. |
| .. | .. | .. | .. |
| CAN BUFFER NUMBER / MESSAGE ID | CAN BUFFER NUMBER / MESSAGE ID | .. | CAN BUFFER NUMBER / MESSAGE ID |

Fig. 6

MESSAGE ID CONVERSION TABLE 325

| ID CONVERSION TABLE (CAN BUFFER 0) | |
|---|---|
| MESSAGE ID 01 | MESSAGE INDEX 01 |
| MESSAGE ID 02 | MESSAGE INDEX 02 |
| MESSAGE ID 03 | MESSAGE INDEX 03 |
| .. | .. |
| MESSAGE ID 0m | MESSAGE INDEX 0m |

| ID CONVERSION TABLE (CAN BUFFER 1) | |
|---|---|
| MESSAGE ID 11 | MESSAGE INDEX 11 |
| MESSAGE ID 12 | MESSAGE INDEX 12 |
| MESSAGE ID 13 | MESSAGE INDEX 13 |
| .. | .. |
| MESSAGE ID 1m | MESSAGE INDEX 1m |

| ID CONVERSION TABLE (CAN BUFFER n) | |
|---|---|
| MESSAGE ID n1 | MESSAGE INDEX n1 |
| MESSAGE ID n2 | MESSAGE INDEX n2 |
| MESSAGE ID n3 | MESSAGE INDEX n3 |
| .. | .. |
| MESSAGE ID nm | MESSAGE INDEX nm |

Fig. 7 ized thereby.

COMMUNICATION MESSAGE CONVERSION DEVICE, COMMUNICATION METHOD AND COMMUNICATION SYSTEM

BACKGROUND OF THE INVENTION

1. Field of the Invention

The present invention generally relates to a communication message conversion device, a communication method and a communication system, and in particular to a communication message conversion device, a communication method and a communication system to be connected to different communication protocol channels.

2. Description of the Related Art

In recent years, the number of electronic equipment to be mounted in vehicles is increasing, and an in-car LAN is being widely used to prevent the increase in the number of wire harnesses for connecting such electronic devices.

For example, with the in-car LAN, the application nodes of Electric Control Units (ECU) and the like provided to the engine control device, transmission control device, and control devices for ABS, dashboard indicators, lights and power windows are connected communicably, and various controls are performed thereby.

FIG. 11 shows a conventional application node employing in an in-car LAN. This application node 100 is connected to a LAN transmission channel 130 such as an in-car LAN, and communicates with the other application nodes 100 via this LAN transmission channel 130. Further, the application node 100 comprises, as illustrated in FIG. 11, a control unit 110 and a communication control unit 120. Moreover, the control unit 110 comprises an application processing unit 111 and a message handling unit 112.

The communication control unit 120 is a communication controller or the like, and enables the communication with other application nodes 100 via the LAN transmission channel 130 according to a communication protocol. For instance, the communication control unit 120 receives a frame from the LAN transmission channel 130 and analyzes the message, and stores the received message in the register of the communication control unit 120.

The control unit 110, for example, is configured by a CPU executing processing according a prescribed program, and cooperating with other hardware.

The message handling unit 112 performs processing based on a transmission/receiving task or the like, and relays the message between the communication control unit 120 and the application processing unit 111. For example, the message handling unit 112 reads the received message from the register of the communication control unit 120, and stores this in the message buffer of the control unit 110.

The application processing unit 111 performs processing based on an application task or the like, and performs the various applications of the application node 100, and performs processing according to the generation of an transmitting message to the other application nodes 100 and the message received from other application nodes 100. For instance, the application processing unit 111 acquires the received message via the message buffer of the control unit 110.

Further, the transmission/receiving task and application task may be scheduled with an OS (not shown), and the respective tasks may be dispatched and executed thereby.

Meanwhile, Controller Area Network (CAN) is known as one of such in-car LANs. The CAN communication system employs a CSMA/CA system, and, when the transmission channel is open, all application nodes are able to transmit a message, and, when the message of other application nodes is flowing in the transmission channel, the other message cannot be transmitted. Specifically, CAN is adopting an event-driven communication system that issues a communication request in accordance with the generation of an incident, and enables transmission only when the transmission right has been obtained. For example, a conventional system employing CAN is disclosed in Japanese Unexamined Patent Application Publication No. 2003-264567.

FIG. 12 is a diagram for explaining the timing operation in the case of employing the application node 100 illustrated in FIG. 11 in CAN. Since CAN is event-driven, a frame is flowing in the CAN transmission channel at odd intervals, and not in a constant cycle as shown in FIG. 12. The frame of CAN contains the SOF (Start Of Frame) representing the start of the frame and EOF (End Of Frame) representing the end of the frame. The communication control unit 120 detects and synchronizes the frame by detecting the SOF, and then receives such frame.

As shown in FIG. 12, when the communication control unit 120 receives the frame, it notifies the frame reception by interrupting the transmission/receiving task, and the transmission/receiving task is executed upon such interruption. And, the transmission/receiving task reads the received message, and stores it in the message buffer.

As shown in FIG. 12, the application task is executed upon storing the received message in the message buffer, and prescribed processing is performed. As described above, the scheduling systems of the transmission/receiving task and application task are also event-driven to match the communication system of CAN, and processing according to the frame flowing at odd intervals in CAN is executed.

Contrarily, FlexRay is attracting attention as a communication protocol that is more reliable than CAN. For example, FlexRay is described on page 115 to 122 of an article entitled "This is 'FlexRay'—the Fast and Reliable In-Car LAN" by Andreas Both and Michio Sato, in "Nikkei Electronics" issued by Nikkei BP on Feb. 2, 2004. FlexRay is adopting the time-trigger communication system which hardly generates delay communication in communication in order to improve reliability. Further, the transmission rate of FlexRay is 10 Mbps at maximum, and, in comparison to the 1 Mbps of CAN, is capable of high-speed communication.

FIG. 13 is a diagram for explaining the flow of the timing operation in a case of employing the application node illustrated in FIG. 11 in FlexRay. As shown in FIG. 13, with the FlexRay transmission channel, the transmission/receiving of frames is conducted based on a time slot partitioned in a prescribed time. For example, as a result of predetermining the time slot to be used by the application node for transmission, the delay variation in communication can be prevented and the bandwidth is guaranteed thereby.

The communication control unit 120 detects the time slot with a timer synchronized to the global time on the network and receives the frame from a prescribed time slot.

As shown in FIG. 13, the execution time of the transmission/receiving task is managed with the timer as used in the communication control unit 120, and the transmission/receiving task is executed at a predetermined time. If the receiving message has arrived at the communication control unit 120 when the task was executed, the transmission/receiving task reads such received message, and stores this in the message buffer. As shown in FIG. 13, the application task is similarly executed at a predetermined time as the momentum, acquires the received message from the message buffer, and prescribed processing is performed thereby.

As described above, the scheduling systems of the transmission/receiving task and application task are also basically time-triggered to match the communication system of FlexRay, and processing according to the frame periodically flowing in FlexRay is often executed.

As described above, with a control unit (application node) configuring a conventional vehicle control system, a system (CAN for instance) of synchronizing with the event and arbitrating the communication collision among the units was dominant. In such a case, a reliable and efficient system was created by giving priority to the control operation of the control unit. Meanwhile, the amount of information communicated among the units has continued to increase due to demands of sophistication of the control system. Further, the information exchanged via the communication channel which was initially auxiliary information, is now becoming information having a significant influence on the operation of control as well as the safety of the vehicle. This kind of qualitative change of information will most likely become greater in the future.

In a conventional communication system, when introducing a time-triggered communication protocol (such as FlexRay) in order to improve the reliability of the dispersive real-time control system, secure the network bandwidth, and determine the amount of delay, it is difficult to divert the existing system and control software and development technology designed for an event-driven communication protocol (such as CAN).

In such a case, in order to make a transition from a conventional event-driven task control system to a time-driven task control system, much time and cost will be required for the significant design change in the system and for the broad reexamination procedures.

Particularly in a power drive control system or motor control system of vehicles requiring high reliability, since the influence of not being able to succeed the software assets created from the past is significant in the majority of the control units, this was a factor in preventing the introduction of new communication technology.

The following drawbacks will arise when adopting the conventional technology capable of realizing the foregoing functions in the present technical field. For example, since the data size of the payload is often smaller than the data size of the message frame management information, when the conventional technology is employed, the transmission efficiency focusing on the payload will become inferior, and the transmission rate of the payload will decrease. Further, when simultaneously using the conversion of the management information (message header), this is substantially difficult since high processing power in comparison to communication processors available in this field will be required, or an extremely large memory must be prepared.

As described above, with a conventional communication system, when a device operating under an event-driven communication protocol tries to use a different communication protocol such as a time-triggered communication protocol, in addition to the diversion of existing configurations being difficult, problems such as deterioration of the transmission efficiency and necessity of high power devices would arise.

SUMMARY OF THE INVENTION

According to one aspect of the present invention, there is provided a communication message conversion device, comprising a first receiving unit receiving a first message according to a first communication protocol, a first message storage unit storing the first message received by the first receiving unit in one of a plurality of buffer areas according to a first message identifier contained in the first message, a first identifier conversion unit converting the first message identifier contained in the first message stored in the first message storage unit into a second message identifier, a first message conversion unit packing a plurality of first messages converted with the first identifier conversion unit into a second message and a first transmission unit transmitting the second message converted with the first message conversion unit according to a second communication protocol.

According to another aspect of the present invention, there is provided a communication message conversion device, comprising a second receiving unit receiving a second message containing a plurality of first messages according to a second communication protocol, a second message conversion unit unpacking the second message received by the second receiving unit and converting this into a plurality of first messages, a second identifier conversion unit converting a second message identifier contained in the first message converted with the second message conversion unit into a first message identifier, a second message storage unit storing the first message converted with the second message conversion unit in one of a plurality of buffer areas according to the second message identifier contained in the received first message and a second transmission unit transmitting the first message stored in the second message storage unit according to a first communication protocol.

According to another aspect of the present invention, there is provided a communication method comprising receiving a first message according to a first communication protocol, storing the received first message in one of a plurality of buffer areas according to a first message identifier contained in the first message, converting the first message identifier contained in the stored first message into a second message identifier, packing the plurality of converted first messages into a second message and transmitting the converted second message according to a second communication protocol.

According to another aspect of the present invention, there is provided a communication method comprising receiving a second message containing a plurality of first messages according to a second communication protocol, unpacking the received second message and converting this into a plurality of first messages, converting the second message identifier contained in the converted first message into a first message identifier, storing the first message converted into the first message identifier in one of a plurality of buffer areas according to the second message identifier contained in the received first message and transmitting the stored first message according to a first communication protocol.

According to another aspect of the present invention, there is provided a communication system comprising first and second communication message conversion devices that mutually communicate according to a second communication protocol. The first communication message conversion device comprises a first receiving unit receiving a first message according to a first communication protocol, a first message storage unit storing the first message received by the first receiving unit in one of a plurality of buffer areas according to a first message identifier contained in the first message, a first identifier conversion unit converting the first message identifier contained in the first message stored in the first message storage unit into a second message identifier, a first message conversion unit packing the plurality of first messages converted with the first identifier conversion unit into a second message and a first transmission unit transmitting the second message converted with the first message conversion unit according to a second communication protocol. The second communication message conversion device comprises a second receiving unit receiving a second message transmitted by the first communication message conversion device according to the second communication protocol, a second message conversion unit unpacking the second message received by the second receiving unit and converting this into a plurality of first messages, a second identifier conversion unit converting the second message identifier contained in the first message converted with the second message conversion unit into a first message identifier, a second message storage unit storing the first message converted with the second message conversion unit in one of a plurality of buffer areas according to the second message identifier contained in the received first message and a second transmission unit transmitting the first message stored in the second message storage unit according to a first communication protocol.

According to the communication message conversion device, the communication method and the communication system of the present invention, since communication channels having different communication protocols can be relayed, existing communication devices will be able to use the new communication protocol. Further, since the received message is sorted into a plurality of buffer areas according to the message identifier, the subsequent processing can be performed within a range based on the buffer area, and the burden of conversion processing or transfer processing can be alleviated. Moreover, since the message identifier is converted into a different identifier and a plurality of messages is communicated by being contained in a single message, communication of data in a size appropriate for the communication protocol is enabled, and the transmission efficiency can be improved thereby.

BRIEF DESCRIPTION OF THE DRAWINGS

The above and other objects, advantages and features of the present invention will be more apparent from the following description taken in conjunction with the accompanying drawings, in which:

FIG. 6 is a diagram showing an example of the data employed in the communication message conversion device according to the present invention;

FIG. 7 is a diagram showing an example of the data employed in the communication message conversion device according to the present invention;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
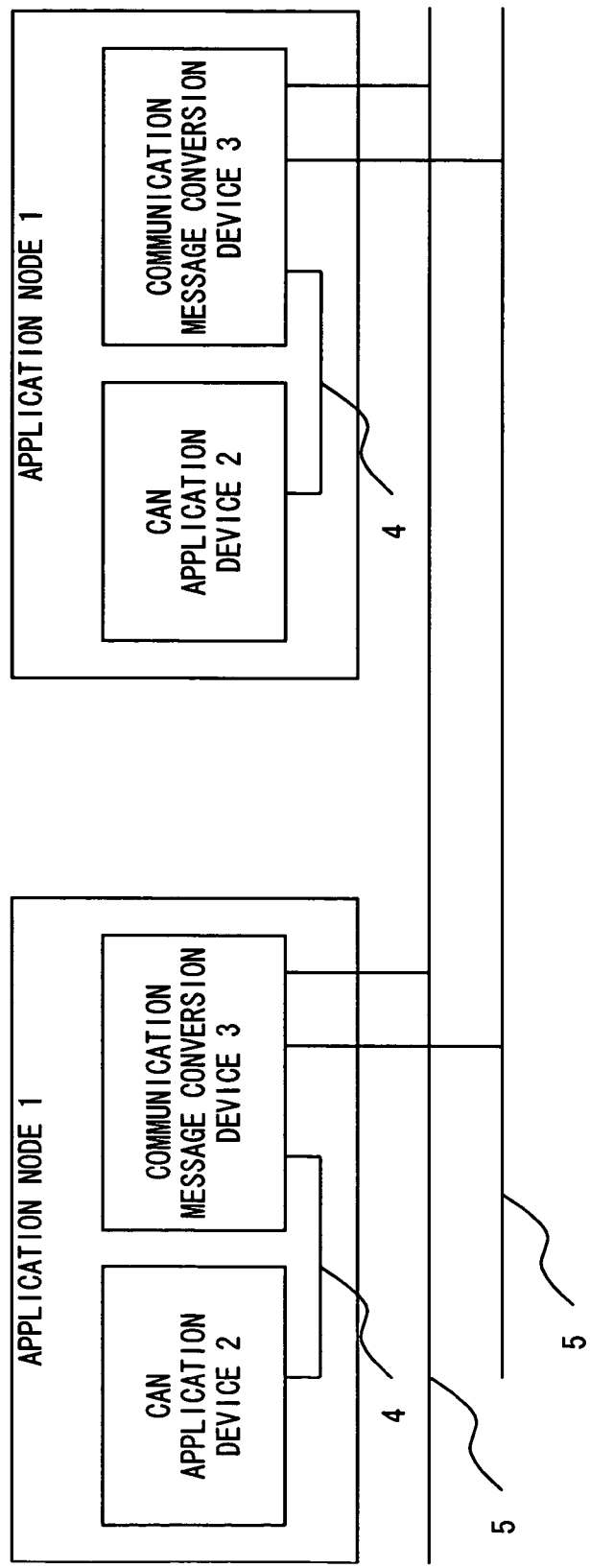
FIG. 1 is a diagram showing a configuration example of the communication system according to the present invention.

First, the configuration example of the communication system according to an embodiment of the present invention is explained with reference to FIG. 1. This communication system, as shown in FIG. 1, comprises two application nodes 1, and the two application nodes 1 are connected communicably via a FlexRay transmission channel 5. In this example, although two application nodes 1 are provided, this is not limited thereto, and an arbitrary number of application nodes 1 may be provided.

This communication system, for instance, is an in-car LAN provided inside vehicles or the like, and FlexRay (second communication protocol) as an example of the time-triggered protocol is used as the communication protocol for communicating between the application nodes 1. Since the FlexRay transmission channel 5 is a transmission channel for communicating according to the FlexRay protocol, highly reliable communication in a broad bandwidth is possible. Further, the FlexRay transmission channel 5 may be used to configure a bus-type or star-type network.

Further, in this example, the application nodes 1 are connected via two FlexRay transmission channels 5 to duplicate the network. As a result of duplicating the network, even if one of the FlexRay transmission channels 5 malfunctions, communication can be made with the other FlexRay transmission channel 5, and the reliability can be improved thereby. Moreover, when independent frames are communicated with the two FlexRay transmission channels 5, the transmission bandwidth can be doubled. In addition, the two FlexRay transmission channels 5 can be used for different purposes. For example, one part of FlexRay transmission channel 5 can be used for the communication of a FlexRay frame to which a CAN frame has been mapped, and the other part of FlexRay transmission channel 5 can be used for the communication of a normal FlexRay frame to which a CAN frame is not mapped.

The application node 1, for example, is an ECU, and is a control device (control unit) of the engine, transmission, ABS, dashboard indicators, steering wheel and the like. The application node 1 may be a single device, or may be configured from a plurality of devices. The application node 1, as shown in FIG. 1, comprises a CAN application device 2 and a communication message conversion device 3, and the CAN application device 2 and communication message conversion device 3 are connected communicably via the CAN transmission channel 4. In addition, the application node 1 may comprise various sensors, controllers or drivers according to the purpose of use as the control device.

The CAN application device 2 and communication message conversion device 3, for example, are respectively configured from a separate package semiconductor device. The CAN transmission channel 4 connecting the CAN application device 2 and communication message conversion device 3 is a transmission path for communicating in accordance with the CAN protocol (first communication protocol), which is an example of an event-driven protocol, and, for instance, is a CAN bus.

The CAN application device (first communication device) 2 executes the various control processing steps of the application node 1, and is also a device capable of communication via CAN. The CAN application device 2 is capable of communication via CAN independently without going through the communication message conversion device 3, and is also able to communicate with other CAN application devices 2 via the CAN transmission channel 4. Specifically, the CAN application device 2 can be used as the application node in an existing network such as CAN. A plurality of CAN transmission channels 4 may be provided between the CAN application device and communication message conversion device 3, one CAN transmission channel can be used for broad bandwidth communication employing FlexRay via the communication message conversion device 3, and the other CAN transmission channel can be used for narrow bandwidth communication employing only CAN.

The communication message conversion device 3 is capable of communication with FlexRay and CAN, and is also a device which maps (converts) and transfers the CAN frame to the FlexRay frame. Specifically, the communication message conversion device 3 relays the communication between the CAN application devices 2 via the FlexRay transmission channel 5, and is a device that enables highly reliable communication in a broad bandwidth.

Further, contention system networks (CAN is used in this example) used by the CAN application device 2 for existing communication are connected pier-to-pier (facing each other) between the CAN application device 2 and the communication message conversion device 3. In the case of an existing network, since several nodes (application nodes) are connected to a contention system network, the transmission bandwidth that could be used by a single node was limited to a part of the bandwidth provided by the overall network. When these are used facing each other, a broader bandwidth can be used since only two nodes will be used.

Although it is preferable that one CAN application device 2 is connected to the communication message conversion device 3, an arbitrary number of CAN application devices 2 may also be connected. When connecting a plurality of CAN application devices 2 to a single communication message conversion device 3, the bandwidth that a single CAN application device 2 can transmit will decrease. Further, the CAN application device 2 may be provided inside the same application node 1 as the communication message conversion device 3 to be connected, or be provided to another device outside the application node 1.

Figure 2:
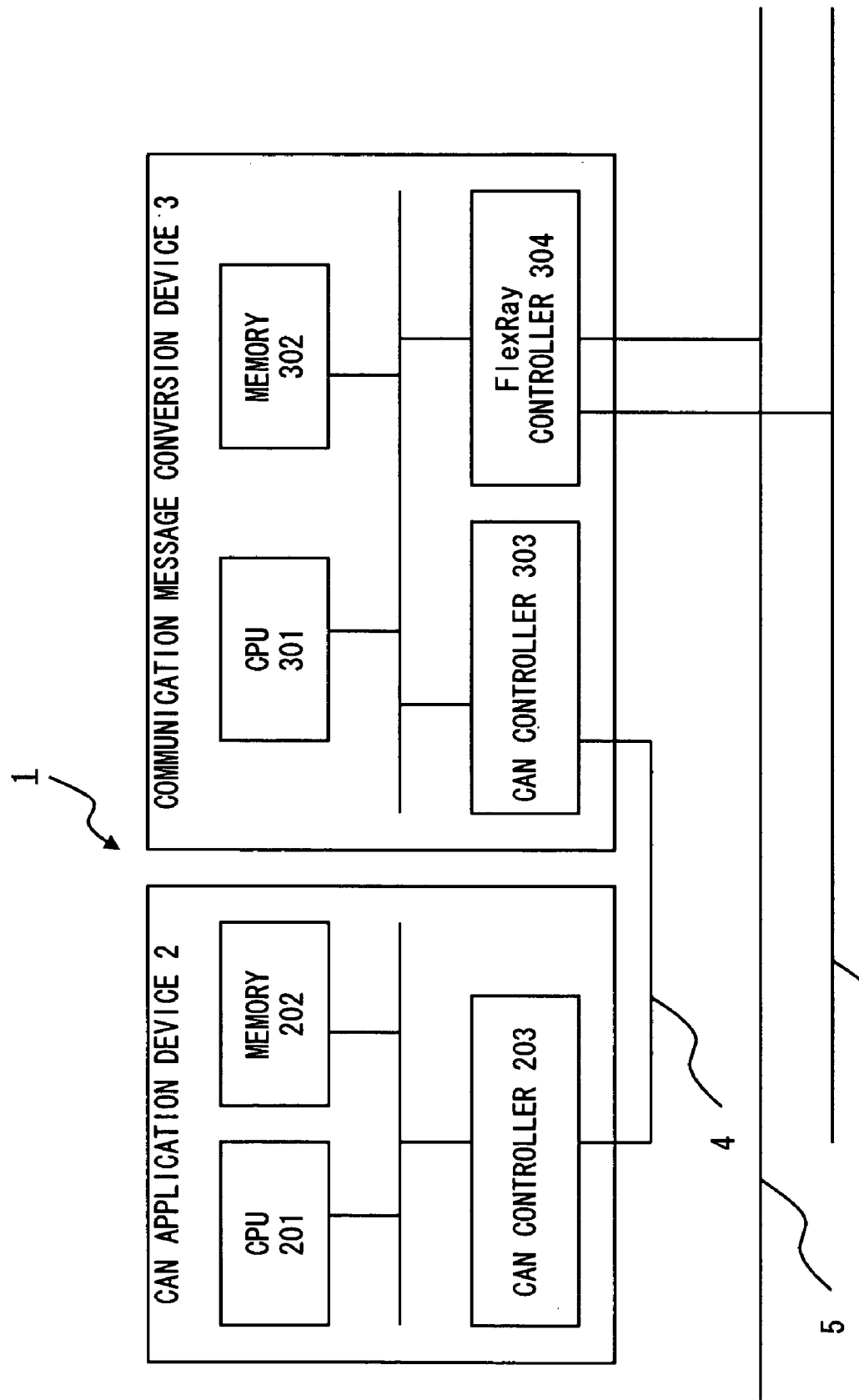
FIG. 2 is a block diagram showing a configuration example of the application node hardware according to the present invention.

Next, a hardware configuration example of the application node according to an embodiment of the present invention is explained with reference to FIG. 2. The CAN application device 2 provided to the application node 1, as shown in FIG. 2, comprises a CPU 201, a memory 202, and a CAN controller 203, and these are electrically connected via a bus or the like, respectively.

The CPU 201 is a processing device for executing various control processing steps of the applications of the CAN application device 2 and the application node 1. The CPU 201 performs processing based on the detection of the various sensors or the like provided to the application node 1, controls the drive unit, and performs processing based on the message data received from the other application nodes 1. For instance, the CPU 201 generates an transmitting message from the data detected with the various sensors, uses the CAN controller 203 to transmit the transmitting message to the other application nodes 1 via the communication message conversion device 3, and uses the CAN controller 203 to receive the message of other application nodes 1 from the communication message conversion device 3 and outputs data to indicators and the like. These processing steps are realized with the programs such as the application program and the like stored in the memory 202. The CPU 201 executes the processing of the control unit 210 described later.

The memory 202 is a storage device such as a ROM or RAM, and stores an OS program or application program, and various data required for processing the respective programs.

The CAN controller 203 is a control device for performing communication control according to the CAN protocol. The CAN controller 203 is connected to the CAN transmission channel 4, and is capable of communication according to the CAN protocol. For instance, the CAN controller 203 generates a CAN frame based on the message created by the CPU 201 according to the CAN protocol, and transmits this to the CAN transmission channel 4 at a prescribed timing. For example, the CAN frame is transmitted according to the availability of the CAN transmission channel 4. Further, the CAN controller 203 receives the CAN frame containing receiving data from the CAN transmission channel 4 according to the CAN protocol, and outputs such receiving date to the CPU 201.

The communication message conversion device 3 provided to the application node 1, as shown in FIG. 2, comprises a CPU 301, a memory 302, a CAN controller 303, and a FlexRay controller 304, and these are electrically connected via a bus or the like, respectively.

The CPU 301 is a processing device for executing the applications of the various control processing steps of the communication message conversion device 3. The CPU 301 performs mutual conversion of CAN and FlexRay in a message format and performs routine processing for converting identification information of messages. For example, the CAN frame received with the CAN controller 303 is converted into a FlexRay frame, and this is transmitted via the FlexRay controller 304. Further, the FlexRay frame received with the FlexRay controller 304 is converted into a CAN frame, and this is transmitted via the CAN controller 303. These processing steps are processing realized with the programs such as the application program and the like stored in the memory 302. The CPU 301 executes the processing of the control unit 310 described later.

The memory 302 is a storage device similar to the memory 202, and stores an OS program or application program, and various data required for processing the respective programs. The memory 302 stores the CAN message buffer 311 and message ID conversion table 325 and so on described later.

The CAN controller 303 is a communication control device similar to the CAN controller 203. The FlexRay controller 304 is a control device for performing communication control according to the FlexRay protocol. The FlexRay controller 304 is connected to the FlexRay transmission channel 5, and is capable of communication according to the FlexRay protocol. For example, the FlexRay controller 304 creates a FlexRay frame according to the FlexRay protocol, and transmits this at a prescribed timing. For example, it transmits the FlexRay frame based on a prescribed time slot subject to time-division. Further, the FlexRay controller 304 receives the FlexRay frame from the FlexRay transmission channel 5 according to the FlexRay protocol, and outputs this to the CPU 301. The FlexRay controller 304 is also connected to the FlexRay transmission channel 5 with a network connection circuit such as a transceiver or the like.

Figure 3:
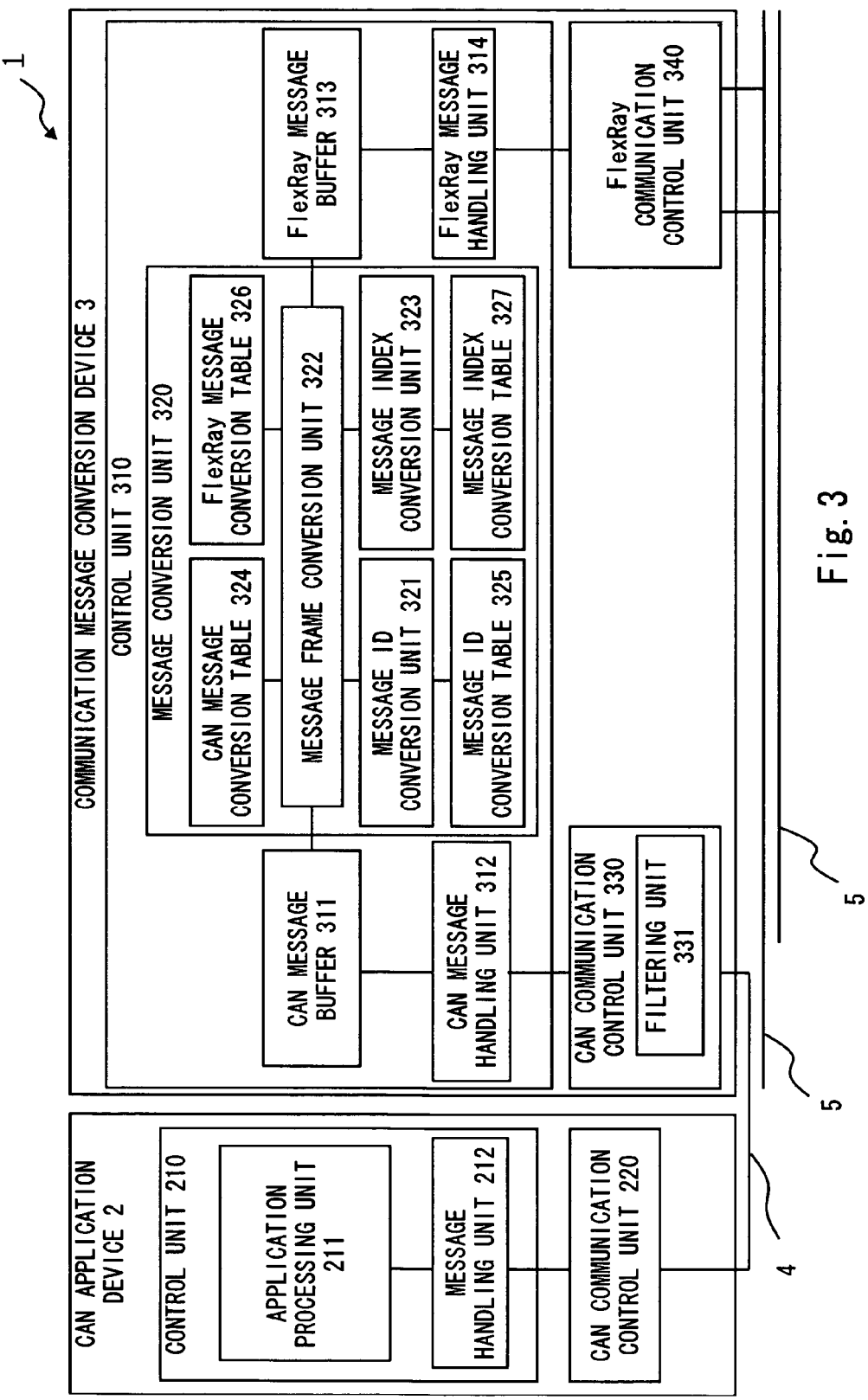
FIG. 3 is a block diagram showing a configuration example of the application node according to the present invention.

Next, a configuration example of the application node according to an embodiment of the present invention is explained with reference to FIG. 3. The CAN application device 2 provided to the application node 1, as shown in FIG. 3, comprises a control unit 210 and a CAN communication control unit 220.

The CAN communication control unit 220 is configured with a CAN controller 203, performs communication according to the CAN protocol, and enables the communication with the communication message conversion device 3 via the CAN transmission channel 4. The CAN communication control unit 220, for instance, has a register for storing the message to be transmitted/received, and creates a transmission frame based on the transmission message written in the register, transmits this to the CAN transmission channel 4, analyzes the frame received from the CAN transmission channel 4, writes this in the register as the received message, and so on.

The control unit 210 comprises an application processing unit 211 and a message handling unit 212. The control unit 210, for example, is configured as a result of the CPU 201 executing processing according to the software program stored in the memory 202, and cooperating with the other hardware configurations.

The application processing unit 211 is a block for executing various control processing steps of the CAN application device 2 and application node 1, and, for instance, is realized with an application task that is created with a prescribed program. The application processing unit 211 creates transmitting messages based on the detection of the various sensors or the like, and performs processing for outputting a request or information to the indicators and the like based on the received message.

The message handling unit 212 is a block for executing processing for relaying messages between the application processing unit 211 and the CAN communication control unit 220, and, for instance, is realized with a transmission/receiving task created with a prescribed program. The message handling unit 212 writes the transmitting message created with the application processing unit 211 in the register of the CAN communication control unit 220, reads the received message from the register of the CAN communication control unit 220, and notifies the application processing unit 211.

The communication message conversion device 3 provided to the application node 1, as shown in FIG. 3, comprises a control unit 310, a CAN communication control unit 330, and a FlexRay communication control unit 340.

The CAN communication control unit 330 is configured similar to the CAN communication control unit 220 of the CAN application device 2, with a CAN controller 303, and enables the communication with the CAN application device 2 via the CAN transmission channel 4. The CAN communication control unit 330, for instance, has a register for storing the message to be transmitted/received, and creates a transmission frame based on the transmission message written in the register, transmits this to the CAN transmission channel 4, analyzes the frame received from the CAN transmission channel 4, writes this in the register as the received message, and so on.

Further, the CAN communication control unit 330 has a filtering unit 331 for performing message acceptance filtering. The filtering unit 331 filters the received CAN frame with the message ID contained in such CAN frame, sorts this for each message ID, and stores this in the register of the CAN communication control unit 330.

The FlexRay communication control unit 340 is configured with a FlexRay controller 304, performs communication control according to the FlexRay protocol, and enables the communication with the other application nodes 1 via the FlexRay transmission channel 5. The FlexRay communication control unit 340, for instance, has a register for storing the message to be transmitted/received, and creates a transmission frame based on the transmission message written in the register, transmits this to the FlexRay transmission channel 5, analyzes the frame received from the FlexRay transmission channel 5, writes this in the register as the received message, and so on.

The control unit 310 comprises a CAN message buffer 311, a CAN message handling unit 312, a FlexRay message buffer 313, a FlexRay message handling unit 314, and a message conversion unit 320. The control unit 310, for example, is configured as a result of the CPU 301 executing processing according to the software program stored in the memory 302, and cooperating with the other hardware configurations.

The CAN message buffer (first and second message storage units) 311 is a buffer containing a plurality of messages for writing/reading to and from the register of the CAN communication control unit 330, and, for example, is stored in the memory 302. As a result of storing a plurality of transmission/receiving messages in the CAN message buffer 311, the writing and reading of messages can be conducted according to the timing of the CAN communication control unit 330. Further, the CAN message buffer 311, as described later, is constituted from a CAN buffer according to the sorting by the filtering unit 331. The CAN message buffer 311 stores the CAN message in one of the plurality of CAN buffers according to the message ID thereof.

The CAN message handling unit 312 is a block for executing processing for relaying messages between the message conversion unit 320 and the CAN communication control unit 330, and, for instance, is realized with a transmission/receiving task created with a prescribed program. The CAN message handling unit 312 is executed when the transmitting message is stored in the CAN message buffer 311, and writes such transmitting message according to the availability of the register of the CAN communication control unit 330. Further, the CAN message handling unit 312 is executed when the message is received by the CAN communication control unit 330, and reads the received message from the register of the CAN communication control unit 330, and stores this in the CAN message buffer 311.

The FlexRay message buffer 313 is a buffer storing a plurality of messages for writing/reading to and from the register of the FlexRay communication control unit 340, and, for example, is stored in the memory 302. As a result of storing a plurality of transmission/receiving messages in the FlexRay message buffer 313, the writing and reading of messages can be conducted according to the timing of the FlexRay communication control unit 340.

The FlexRay message handling unit 314 is a block for executing processing for relaying messages between the message conversion unit 320 and the FlexRay, communication control unit 340, and, for instance, is realized with a transmission/receiving task created with a prescribed program. The FlexRay message handling unit 314 is periodically executed, and when the transmitting message is stored in the FlexRay message buffer 313, it writes such transmitting message in the register of the FlexRay communication control unit 340. Further, when the message is received by the FlexRay communication control unit 340, the FlexRay message handling unit 314 reads the received message from the register of the FlexRay communication control unit 340, and stores this in the FlexRay message buffer 313.

The message conversion unit 320 is a block for executing processing of mutually converting the CAN message and FlexRay message. Further, as shown in FIG. 3, the message conversion unit 320 comprises a message ID conversion unit 321, a message frame conversion unit 322, a message index conversion unit 323, a CAN message conversion table 324, a message ID conversion table 325, a FlexRay message conversion table 326, and a message index conversion table 327. The message conversion unit 320 may be executed with a plurality of application tasks, or may be executed with a single application task.

The CAN message conversion table 324, message ID conversion table 325, FlexRay message conversion table 326, and message index conversion table 327 are stored, for example, in the memory 302.

The CAN message conversion table 324 is a table associating the CAN message received from the CAN transmission channel 4 and the FlexRay message transmitted to the FlexRay transmission channel 5. Specifically, the CAN message conversion table 324 prescribes how to map the CAN message to which FlexRay message based on the message ID and message buffer of the CAN message.

The message ID conversion table 325 is a table for associating the message ID contained in the CAN message received from the CAN transmission channel 4 and the message index for mapping to the FlexRay message transmitted to the FlexRay transmission channel 5. Specifically, the message ID conversion table 325 prescribes how to convert the message ID to which message index based on the message ID.

The FlexRay message conversion table 326 is a table for associating the FlexRay message received from the FlexRay transmission channel 5 and the CAN message transmitted to the CAN transmission channel 4. Specifically, the FlexRay message conversion table 326 prescribes how to store the CAN message in which CAN buffer of the CAN message buffer 311 or whether it is a CAN message to be received.

The message index conversion table 327 is a table for associating the message index of the CAN message mapped to the FlexRay message received from the FlexRay transmission channel 5, and the message ID contained in the CAN frame transmitted to the CAN transmission channel 4. Specifically, the message index conversion table 327 prescribes how to convert the message index to which message ID based on the message index of the CAN message mapped to the FlexRay message.

The message ID conversion unit 321, message frame conversion unit 322, and message index conversion unit 323, for example, are realized with a message conversion task created with a prescribed program.

The message ID conversion unit (first identifier conversion unit) 321 converts the message ID (first message identifier) contained in the CAN message received from the CAN transmission channel 4 into a message index (second message identifier) for mapping to the FlexRay message transmitted to the FlexRay transmission channel 5.

The message index conversion unit (second identifier conversion unit) 323 converts the message index of the CAN message mapped to the FlexRay message received from the FlexRay transmission channel 5 into a message ID of the CAN message to be transmitted to the CAN transmission channel 4 based on the data of the message index conversion table 327.

The message frame conversion unit (first and second message conversion units) 322 performs the mutual conversion of the data configuration falling under the payload of the CAN message and FlexRay message. Specifically, the message frame conversion unit 322 maps the CAN message received from the CAN transmission channel 4 to the payload of the FlexRay message transmitted to the FlexRay transmission channel 5 based on the data of the CAN message conversion table 324, and packs a plurality of CAN messages. Further, the message frame conversion unit 322 unpacks the payload of the FlexRay message received from the FlexRay transmission channel 5 to the respective CAN messages, and sorts such CAN messages to the CAN buffer of the CAN message buffer 311 based on the data of the FlexRay message conversion table 326.

In the foregoing configuration, the communication processing to be performed to the FlexRay network by the communication message conversion device 3 is an operation to be conduced under an execution schedule that is independent from the software of the application processing unit 211 of the CAN application device 2, and, from the side of the application processing unit 211, it looks as though the conventional CAN network is operating at high speed in a broad bandwidth.

Figure 4:
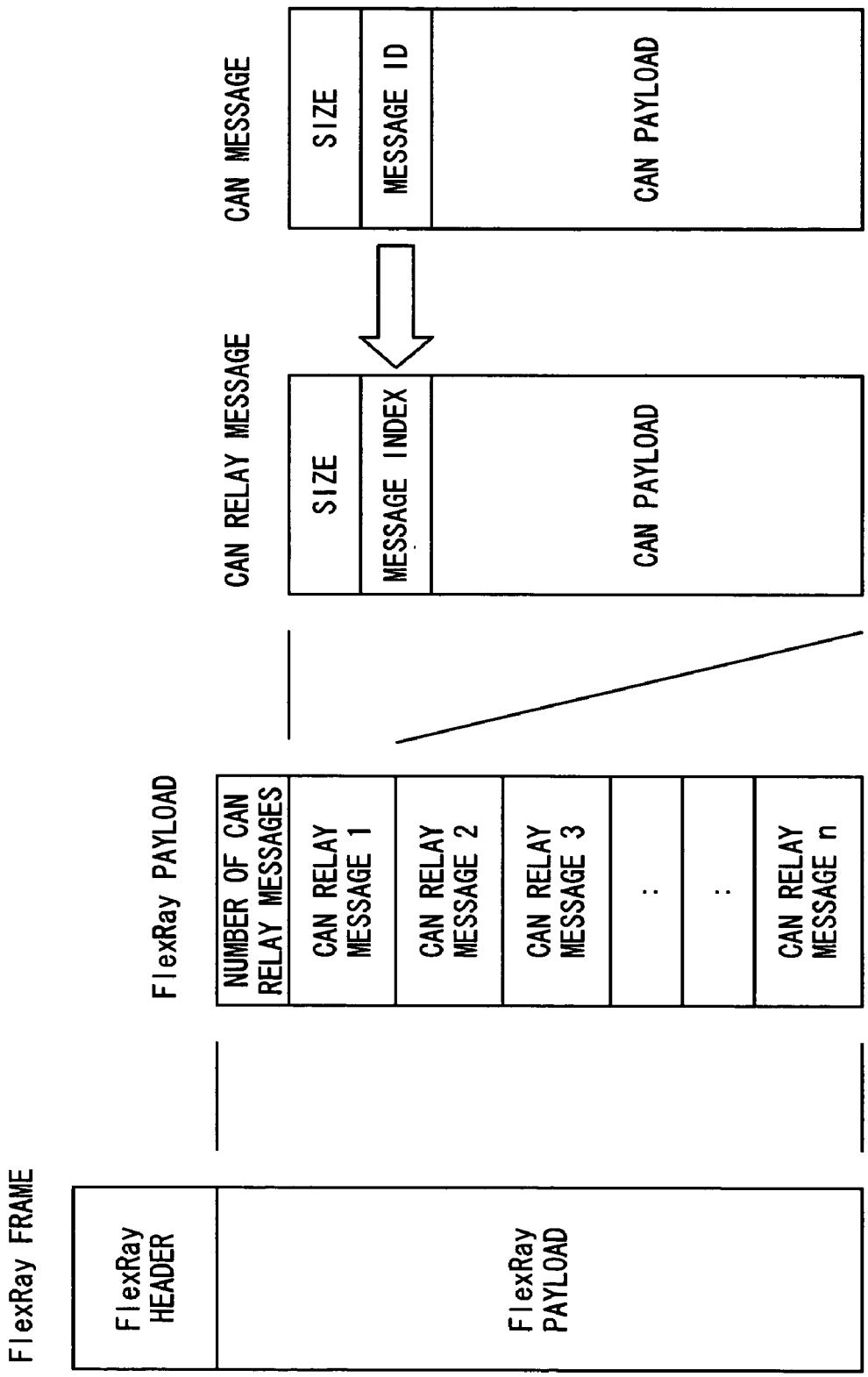
FIG. 4 is a diagram showing an example of the data employed in the communication message conversion device according to the present invention.

Next, the data used in the communication message conversion device according to the present embodiment is explained with reference to FIG. 4 to FIG. 8. FIG. 4 is a diagram showing the configuration of the FlexRay frame, and the CAN message to be mapped to the FlexRay frame.

The CAN message shown in FIG. 4 is a message format for writing/reading to and from the register of the CAN communication control unit 330, and is a format that is stored in the CAN message buffer 311. This CAN message contains, as shown in the diagram, "size", "message ID", and "CAN payload". "Size" is a field representing the length of the "message ID" and "CAN payload", and, for example, the field length is 1 byte. "Message ID" is a field representing the type of message, is prescribed with the CAN protocol, and the field length is 4 bytes. "CAN payload" is field containing the message data, is prescribed with the CAN protocol, and the field length is 0 to 8 bytes.

The CAN relay message shown in FIG. 4 is a format for mapping and relating the CAN message shown in FIG. 4 to the FlexRay frame. This CAN relay message contains, as shown in the diagram, "size", "message index", and "CAN payload". "Size" is a field representing the length of the "message index" and "CAN payload", and, for example, the field length is 1 byte.

"Message index" is a field representing the index corresponding to the "message ID" of the CAN message shown in FIG. 4, and, for example, the field length is 1 bytes. Since the "message ID" of the CAN message occupies 4 bytes in comparison to the maximum 8 bytes of the CAN payload, it is mapped and transferred to the FlexRay frame as is, the transmission efficiency will be inferior. Thus, the 1 byte of the "message ID" is compressed into a "message index" to seek the improvement of the transmission efficiency. Further, as a result of making the "message index" 1 byte, the burden on the search processing or mapping processing can be alleviated.

In this example, the "CAN payload" of the CAN relay message is the same as the "CAN payload" of the CAN message. The "CAN payload" of the CAN message does not have to be transferred as is, and the "CAN payload" may be converted with an algorithm such as compression or encryption. If the "CANpayload" is compressed, the transmission efficiency can be further improved.

The FlexRay payload shown in FIG. 4 is a field containing the message data in the FlexRay frame. The FlexRay payload is prescribed with the FlexRay protocol, and the field length is, for example, 32 bytes. In this example, as shown in the diagram, the FlexRay payload contains the "number of CAN relay messages" and a plurality of "CAN relay messages". The "number of CAN relay messages" is a field showing the number of the CAN relay messages contained in the FlexRay payload, and, for example, the field length is 1 byte. The "CAN relay message" is the CAN relay message shown in FIG. 4. The FlexRay payload stores a plurality of CAN relay messages according to the priority of the message ID of the CAN message. For instance, if the length of the CAN relay message is 10 bytes, three CAN relay messages will be stored in a 32-byte FlexRay payload.

The FlexRay frame shown in FIG. 4 is a frame format communicated via the FlexRay transmission channel 5 based on the FlexRay communication control unit 340. This FlexRay frame contains, as shown in the diagram, a "FlexRay header" and a "FlexRay payload". The "FlexRay header" contains an identifier or the like of the FlexRay message, and is prescribed with the FlexRay protocol. The "FlexRay payload" is the FlexRay payload shown in FIG. 4.

The format of being written/read to and from the memory of the FlexRay communication control unit 340 and stored in the FlexRay message buffer 313 may be this FlexRay frame, or a part of the FlexRay payload and FlexRay header.

Figure 5:
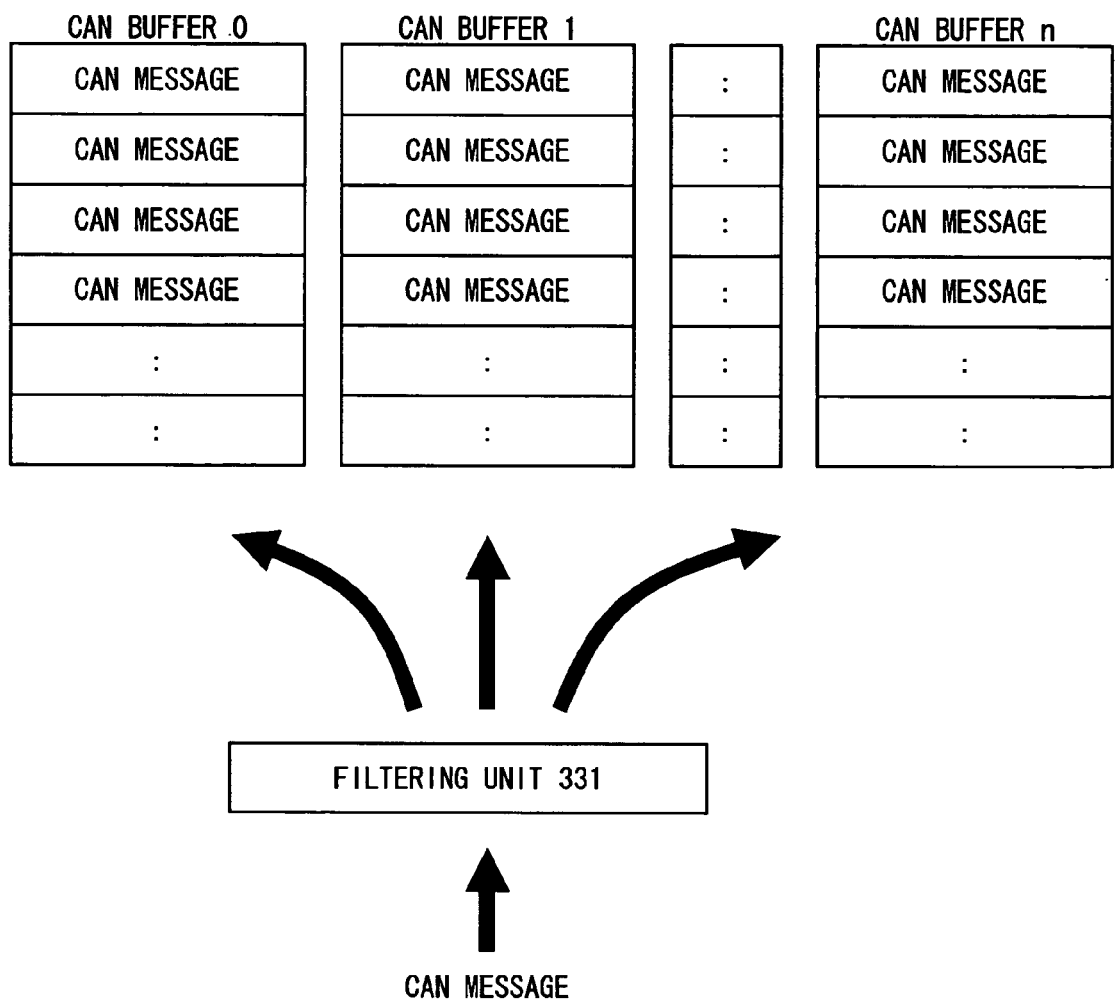
FIG. 5 is a diagram showing an example of the data employed in the communication message conversion device according to the present invention.

FIG. 5 is a diagram showing an example of the data configuration of the CAN message buffer 311. As shown in FIG. 5, the CAN message buffer 311, for example, is configured in a two-dimensional array, and has a plurality of CAN buffers. A buffer number is provided to each of the CAN buffers, and in this example, there are CAN buffers 0 to n. Each of the CAN buffers contains a plurality of CAN messages. This CAN message is the CAN message shown in FIG. 4.

The CAN frame received with the CAN communication control unit 330 is sorted to a plurality of registers of the CAN communication control unit 330 based on the message ID of the received CAN frame in the filtering unit 331. The register and CAN buffer of the CAN communication control unit 330 correspond to each other, and the corresponding CAN buffer is stored in the register of the CAN communication control unit 330 by the CAN message handling unit 312. Specifically, the received messages are sorted with the filtering unit 331, and stored in the CAN buffers according to such sorting.

The number of CAN buffers corresponds to the sorting of the filtering unit 331, and, for instance, there are 32 CAN buffers. The filtering unit 331 conducts such sorting based on the message ID of the CAN frame. Although there is only one CAN message buffer 311 in this diagram, the CAN message buffer for transmission and the CAN message buffer for receiving can be provided separately.

FIG. 6 is a diagram showing an example of the data configuration of the CAN message conversion table 324. As shown in the diagram, the CAN message conversion table 324, for example, is configured in a two-dimensional array, and has a plurality of FlexRay message tables. The FlexRay message table is provided for each FlexRay message, and, in this example, FlexRay message tables corresponding to 1 ton FlexRay messages are provided. Each FlexRay message table stores the message ID of the CAN frame according to its priority, and also stores the CAN buffer number corresponding to such message ID. Priority of the message ID is prescribed with the CAN protocol, and smaller the message ID, higher the priority.

For example, a destination CAN node (CAN application device 2 in this example) is set in advance, and the message ID of the CAN frame to be used in the communication with the set destination CAN node is determined in advance. Further, the FlexRay message for mapping the CAN message to be used is determined in advance. According to this, the FlexRay message table to be used can be specified in advance.

Specifically, as a result of referring to the CAN buffer defined in the FlexRay message table that was specified in advance and confirming whether the message of a prescribe message ID has arrived, the receiving of messages can be monitored efficiently.

FIG. 7 is a diagram showing an example of the data configuration of the message ID conversion table 325. As shown in the diagram, the message ID conversion table 325, for example, is configured in a two-dimensional array, and has a plurality of ID conversion tables. The ID conversion table is provided to each CAN buffer, and, in this example, ID conversion tables corresponding to CAN buffer 0 to CAN buffer n are provided. Each ID conversion table stores a message ID and a message index corresponding to such message ID. The message ID and message index stored in the respective ID conversion tables are of separate values, and the same message ID and same message index will never be stored in a plurality of ID conversion tables.

Since a prescribed message ID filtered with the filtering unit 331 is stored in each CAN buffer of the CAN message buffer 311, the ID table of each CAN buffer needs to store only a prescribed ID that can be obtained via filtering. Specifically, upon converting the message ID into a message index, the burden on the processing of searching for the message ID can be alleviated since it will suffice to search only the ID table for each CAN buffer. For example, there are 32 CAN buffers, and the search processing can simply be shortened to 1/32 processing. Still, in reality, since the message ID to be used in each CAN buffer is limited further, it is possible to obtained better results.

Figure 8A:
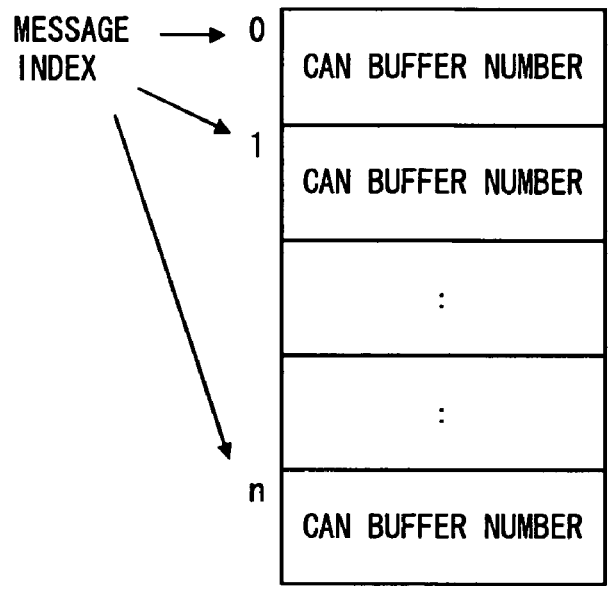
FIG. 8A and FIG. 8B are a diagram showing an example of the data employed in the communication message conversion device according to the present invention.
Figure 8B:
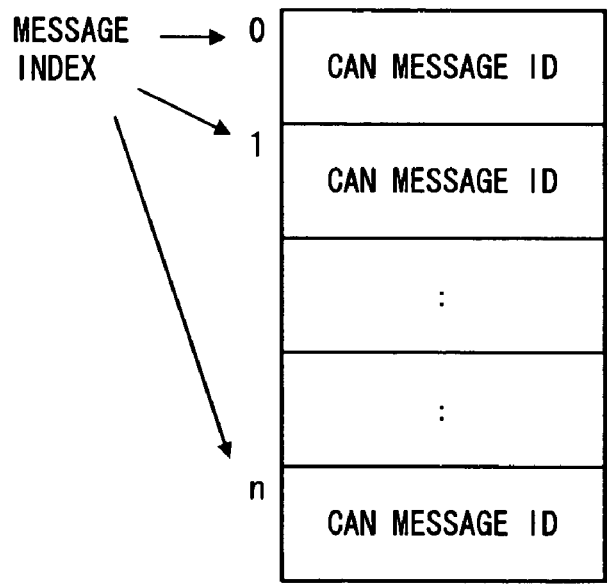

FIG. 8A and FIG. 8B are a diagram showing an example of the data configuration of the FlexRay message conversion table 326 and the message index conversion table 327. As shown in FIG. 8A, the FlexRay message conversion table 326, for example, is configured in a one-dimensional array, and has a plurality of CAN buffer numbers. The CAN buffer numbers are stored in order in the message index. Specifically, as a result of making the message index the index value of the table, the CAN buffer number can be acquired by directly referring to the table without having to perform search processing. As an example of referring to the index value of the table, the index may be an array number of the table array, or this may be an offset value from the top address of the table. Further, the FlexRay message conversion table 326 also performs filtering on whether to make the received CAN message a target of receiving. For instance, 0xFF is stored in the CAN buffer number of the message index that is not subject to receiving.

As shown in FIG. 8B, the message index conversion table 327, for example, is configured in a one-dimensional array, and has a plurality of message IDs. The message IDs are store in order in the message index. Specifically, as with the FlexRay message conversion table 326, the message ID can be acquired by directly referring to the table from the message index without having to conduct any search.

Since both the FlexRay message conversion table 326 and the message index conversion table 327 are both lined in the order of the message index, these may also be used as a single table.

Figure 9:
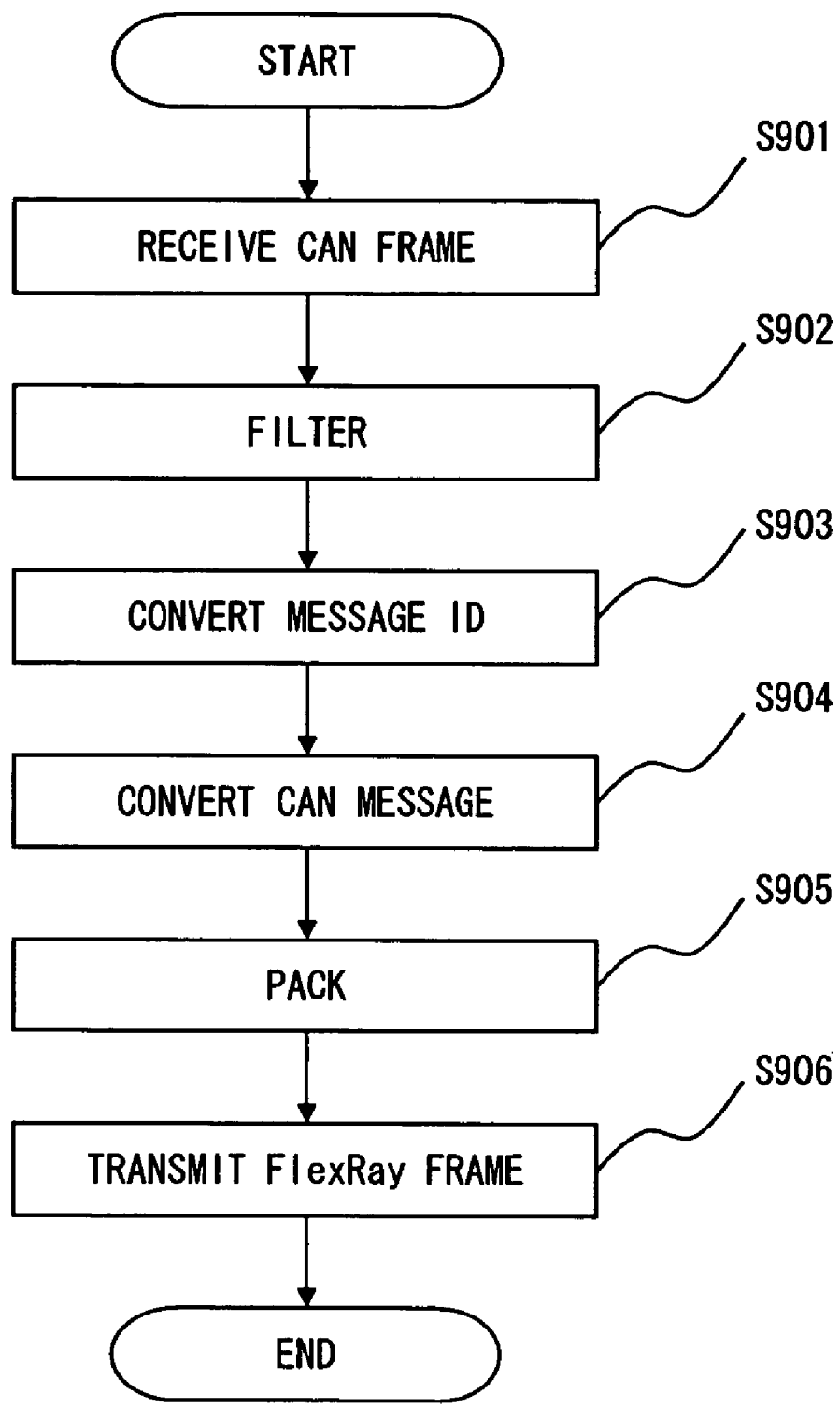
FIG. 9 is a flowchart showing an example of the processing performed with the communication conversion device according to the present invention.

Next, the processing of message transfer of the communication message conversion device according to the present embodiment is explained with reference to FIG. 9 and FIG. 10. The flowchart of FIG. 9 shows the processing of receiving the CAN frame and transmitting the FlexRay frame.

When transferring the CAN frame to the FlexRay frame, foremost, the communication message conversion device 3 receives the CAN frame from the CAN transmission channel 4 (S901). Specifically, the CAN communication control unit 330 of the communication message conversion unit 3 receives the CAN frame transmitted with the CAN application device 2 from the CAN transmission channel 4 according to the CAN protocol.

Next, the communication message conversion device 3 filters the received CAN frame (S902). Specifically, the filtering unit 331 of the CAN communication control unit 330 sorts the CAN frame received at S901 with the acceptance filter function and the bit masking function thereof based on the message ID of such CAN frame, and writes this in one of the plurality of registers of the CAN communication control unit 330. Here, the received CAN frame is written in the register in the format of the CAN message shown in FIG. 4. Then, the CAN message handling unit 312 is executed based on the interruption or the like in the completed receiving from the CAN communication control unit 330, reads such CAN message from the register of the CAN communication control unit 330, and stores this in one of the CAN buffers of the CAN message buffer 311. Here, the CAN message handling unit 312 stores such CAN message in the CAN buffer corresponding to the read register.

Next, the communication message conversion device 3 converts the message ID of the CAN message into a message index (S903) Specifically, the message frame conversion unit 322 of the communication message conversion unit 3 periodically monitors to see whether the CAN message of the message ID contained in the FlexRay message table is stored in the CAN buffer based on the CAN message conversion table 324. When the CAN message is stored in the CAN buffer, the message frame conversion unit 322 acquires such CAN message, and notifies the message ID and CAN buffer number contained in the CAN message to the message ID conversion unit 321.

The message ID conversion unit 321 searches for the corresponding ID conversion table in the message ID conversion table 325 based on the notified message ID and CAN buffer number. The message ID conversion unit 321 searches the message ID in key and acquires the corresponding message index. Further, the message ID conversion unit 321 notifies such message index to the message frame conversion unit 322. Here, since filtering is conducted at S902, the scope of search is limited to the partial space of the message ID space. Thus, the number of targets to be searched is narrowed down, and the search can be efficiently performed.

Next, the communication message conversion device 3 converts the CAN message into a CAN relay message (S904). Specifically, the message frame conversion unit 322 creates the CAN relay message shown in FIG. 4 based on the CAN payload of the CAN message acquired from the CAN buffer, the message index converted at S903, and the sizes thereof.

Next, the communication message conversion device 3 packs the CAN relay message (S905). Specifically, the message frame conversion unit 322 packs the CAN relay message created at S904, adds the number of CAN relay frames, and creates the FlexRay payload shown in FIG. 4.

At S903, when a plurality of CAN messages corresponding to the message ID contained in the FlexRay message table of the CAN message conversion table 324 is stored in the CAN buffer, the message frame conversion unit 322 repeats S903 and S904 regarding each of such plurality of CAN messages, and thereafter packs the plurality of CAN relay messages. The message frame conversion unit 322 stores the created FlexRay payload in the FlexRay message buffer 313 as the FlexRay message.

Next, the communication message conversion device 3 transmits the FlexRay frame to the FlexRay transmission channel 5 (S906). Specifically, the FlexRay message handling unit 314 of the communication message conversion device 3 periodically monitors whether the FlexRay message to be transmitted to the FlexRay message buffer 313 is stored. When the FlexRay message is stored in the FlexRay message buffer 313, the FlexRay message handling unit 314 acquires such message, and write this in the register of the FlexRay communication control unit 340. When the FlexRay communication control unit 340 periodically monitors the register and the FlexRay message is written in the register, it transmits the message as the FlexRay frame to the FlexRay transmission channel 5 according to the FlexRay protocol.

Figure 10:
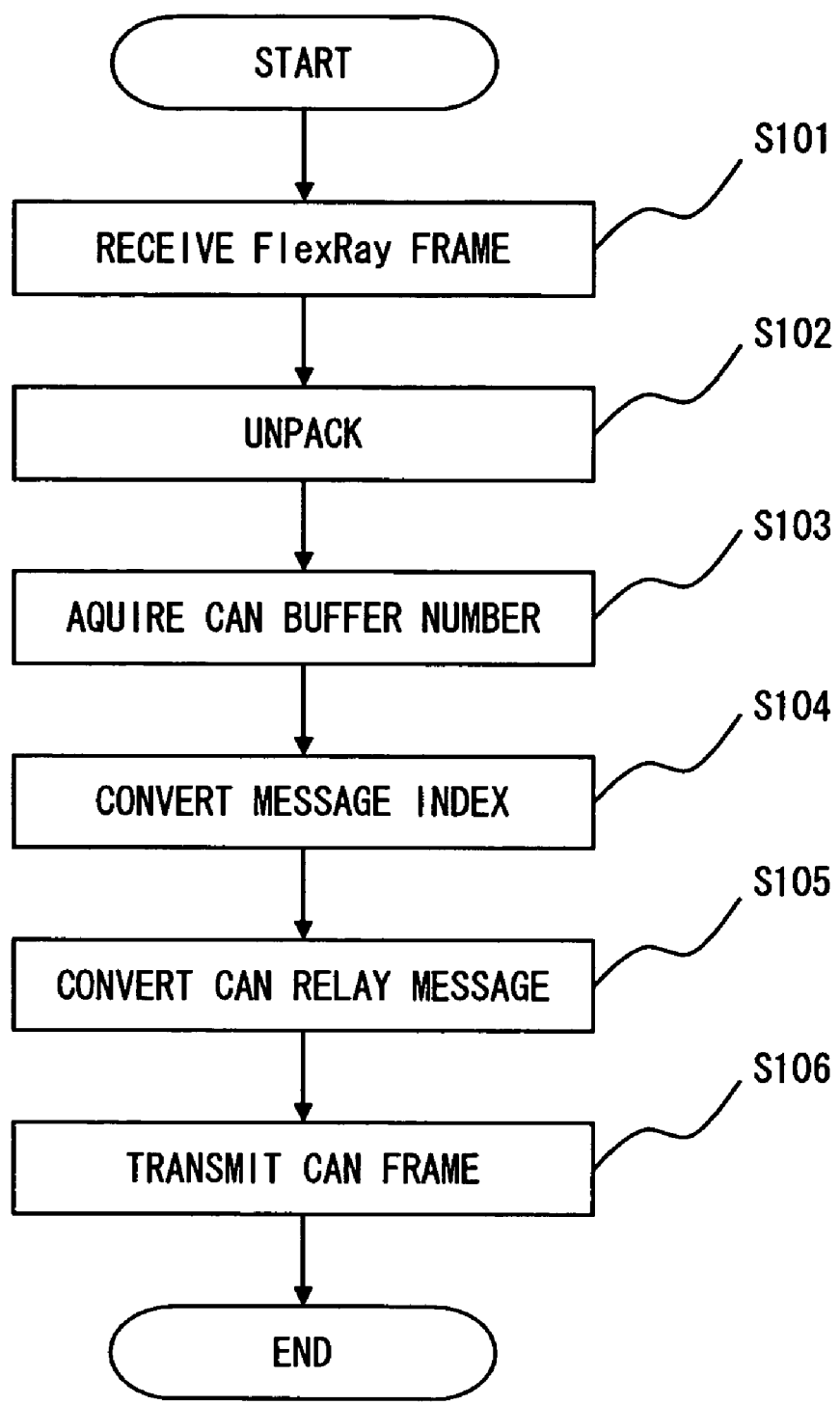
FIG. 10 is a flowchart showing an example of the processing performed with the communication conversion device according to the present invention.
Figure 11:
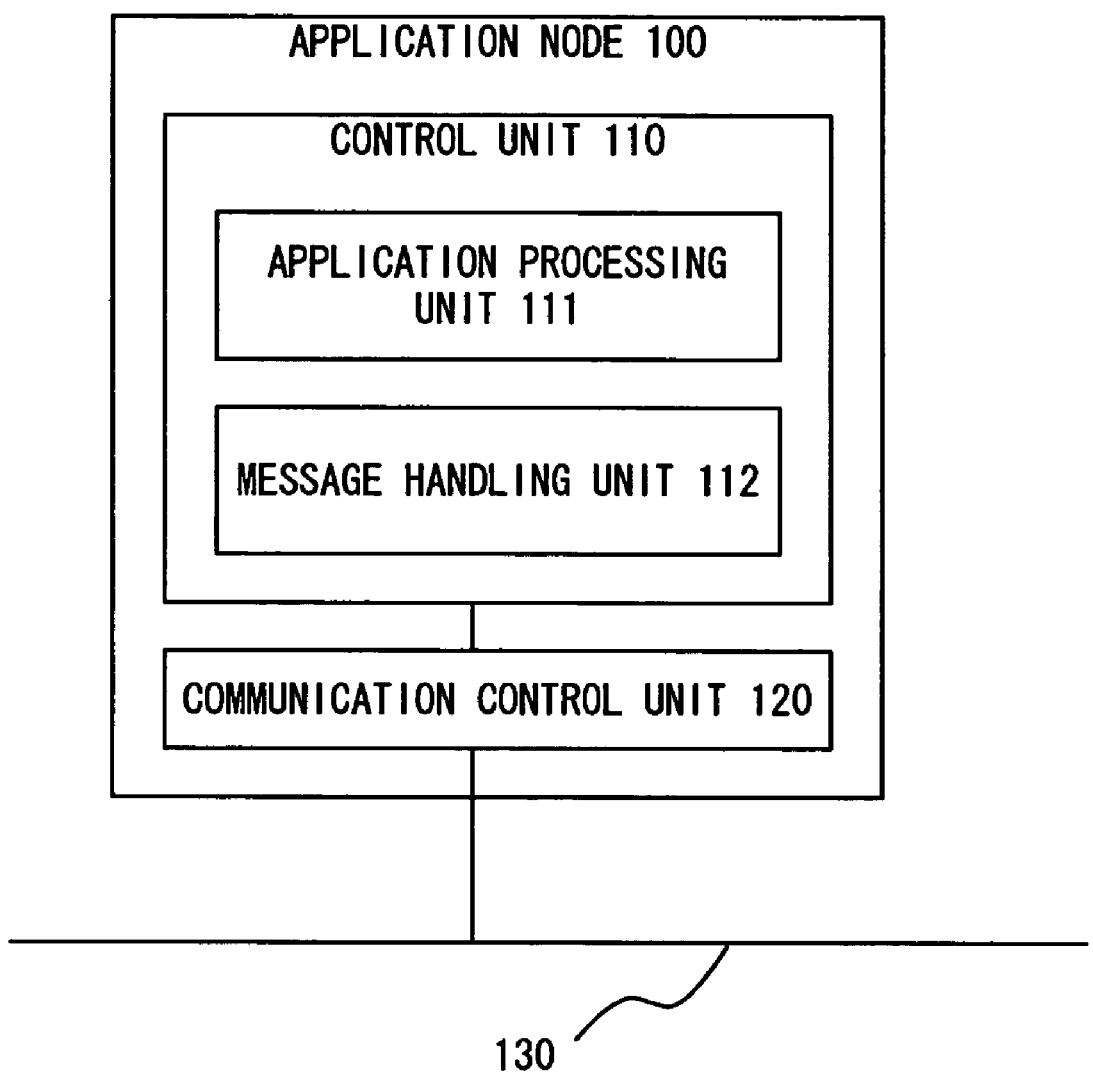
FIG. 11 is a block diagram showing a configuration example of the conventional application node.
Figure 12:
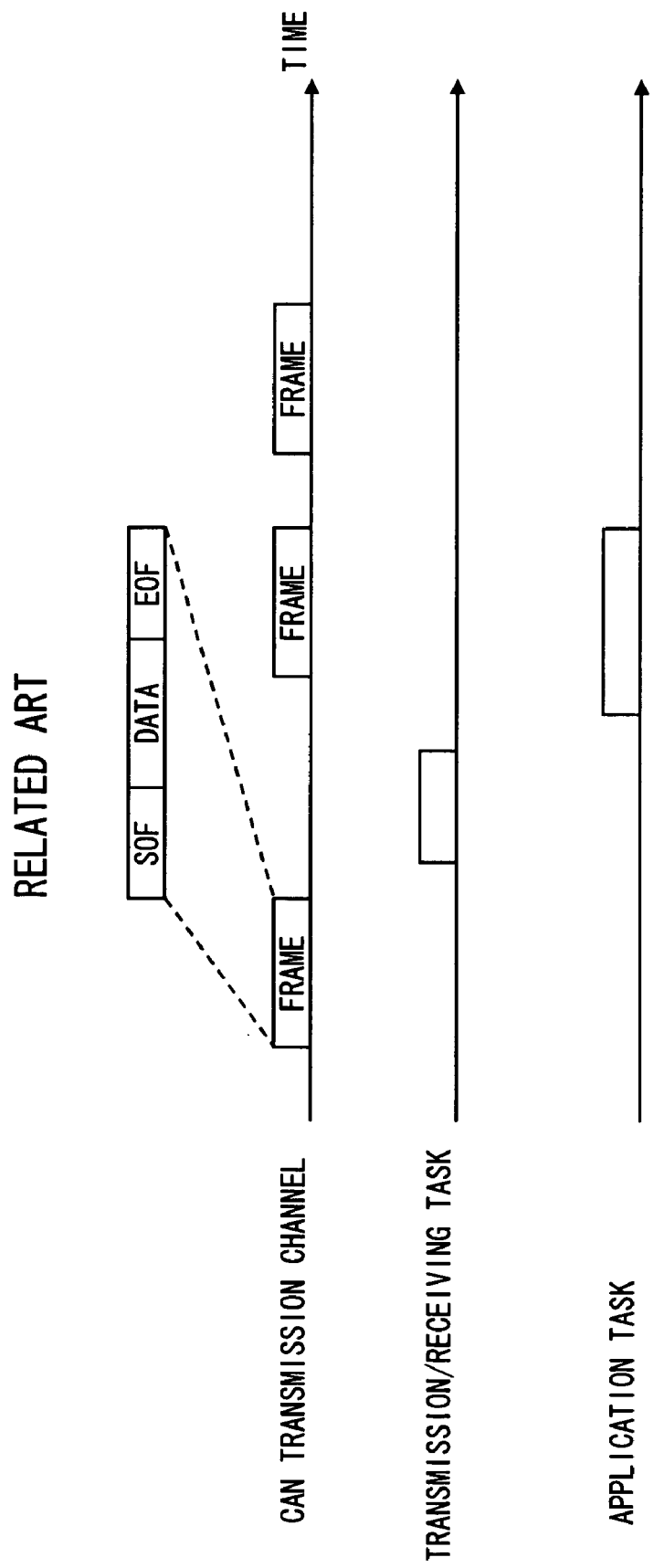
FIG. 12 is a view showing a frame format of the operation of the communication frame and task.
Figure 13:
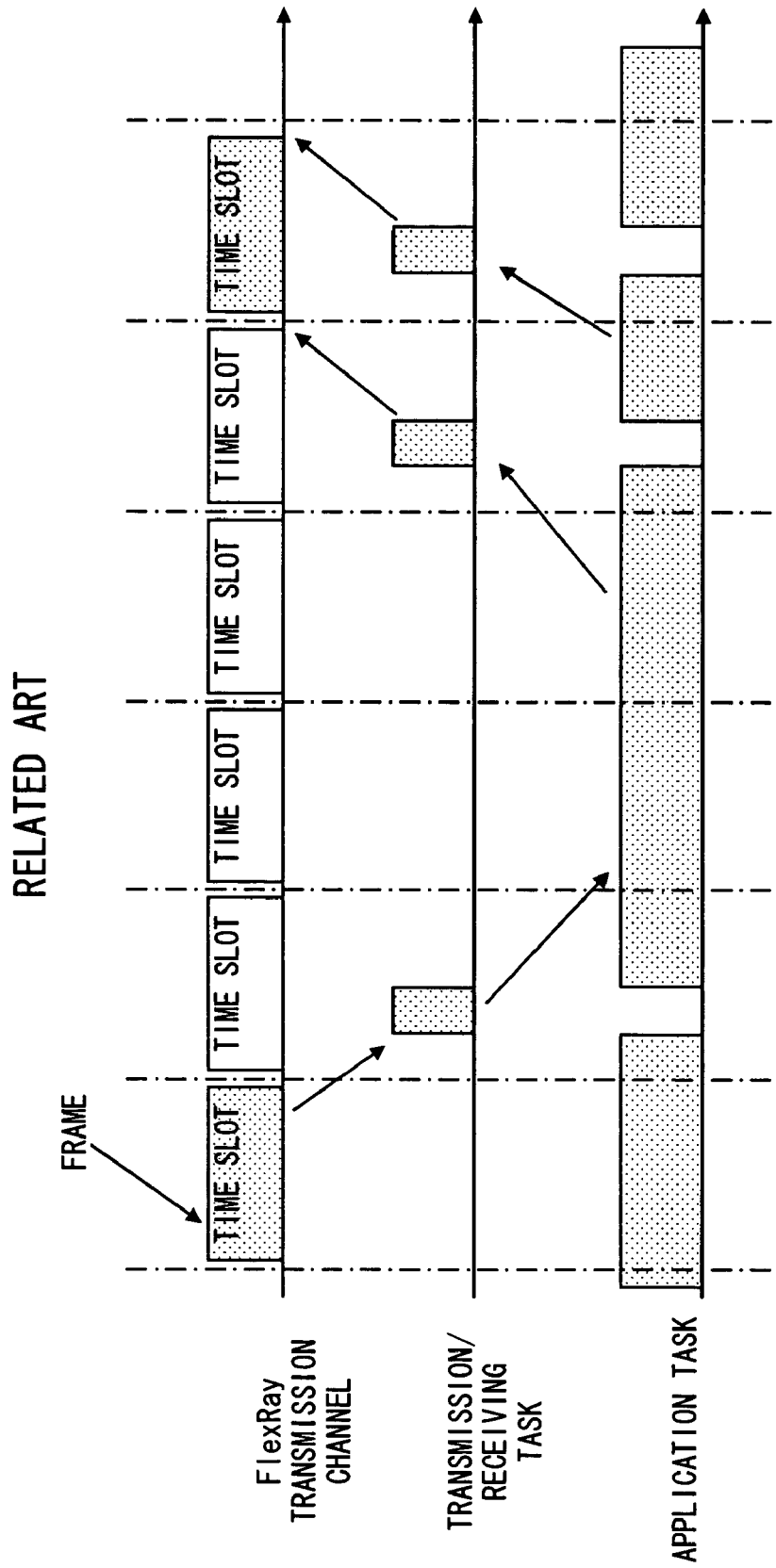
FIG. 13 is a view showing a frame format of the operation of the communication frame and task.

The flowchart shown in FIG. 10 shows the processing of receiving the FlexRay frame and transmitting the CAN frame. When transferring the FlexRay frame to the CAN frame, foremost, the communication message conversion device 3 receives the FlexRay frame from the FlexRay transmission channel 5 (S101). Specifically the FlexRay communication control unit 340 of the communication message conversion device 3 receives from the FlexRay transmission channel 5 the FlexRay frame transmitted by the other application nodes 1 according to the FlexRay protocol. For example, the FlexRay frame is received upon being subject to low-layer signal processing such as bit decryption, clock extraction, cluster clock synchronization or the like as well as error detection or the like by the FlexRay communication control unit 340. And, the received FlexRay frame is written in the register of the FlexRay communication control unit 340 as a FlexRay message. The FlexRay message handling unit 314 periodically monitors the register of the FlexRay communication control unit 340. When a FlexRay message is written in the register, the FlexRay message handling unit 314 reads such message, and stores it in the FlexRay message buffer 313.

Next, the communication message conversion device 3 unpacks the FlexRay payload of the received FlexRay message (S102). Specifically, the message frame conversion unit 322 of the communication message conversion device 3 periodically monitors whether the received FlexRay message is stored in the FlexRay message buffer 313. When the FlexRay message is stored in the FlexRay message buffer 313, the message frame conversion unit 322 acquires such message. And, the message frame conversion unit 322 unpacks (divides) the FlexRay payload of such message to the plurality of CAN relay messages. Here, the number of CAN relay messages contained in the FlexRay payload is equal to that of the unpacked CAN relay frames. When a plurality of CAN relay messages is contained in a single FlexRay payload, the following processing steps will be repeated for each CAN relay message.

Next, the communication message conversion device 3 acquires the CAN buffer number for storing the CAN message (S103). Specifically, the message frame conversion unit 322 acquires the CAN buffer number for storing the CAN message with respect to the CAN relay messages unpacked at S102. The message frame conversion unit 322 refers to the FlexRay message conversion table 326 based on the message index contained in such CAN relay message, and acquires the CAN buffer number. Here, when the acquired CAN buffer is 0xFF, the following processing steps will not be performed since such message is deemed to be a CAN message not subject to receiving.

Next, the communication message conversion unit 3 converts the message index into a message ID (S104). Specifically, the message frame conversion unit 322 notifies the message index contained in the CAN relay message unpacked at S102 to the message index conversion unit 323. The message index conversion unit 323 converts the notified message index into a message ID. The message index conversion unit 323 refers to the message index conversion table 327 based on the message index and acquires the message ID. The message index conversion unit 323 notifies such message ID to the message frame conversion unit 322.

Next, the communication message conversion device 3 converts the CAN relay message into a CAN message (S105). Specifically, the message frame conversion unit 322 creates a CAN message based on the CAN payload of the CAN relay message, the message ID converted at S104, and the sizes thereof. The message frame conversion unit 322 stores the created CAN message in the CAN buffer of the CAN message buffer 311 of the number acquired at S103.

Next, the communication message conversion unit 3 transmits the CAN frame to the CAN transmission channel 4 (S106) Specifically, the CAN message handling unit 312 of the communication message conversion unit 3 is executed when the CAN message is stored in the CAN buffer of the CAN message buffer 311, and writes such message in the register of the CAN communication control unit 330. Here, the CAN message handling unit 312 writes the message in the register of the CAN communication control unit 330 by waiting for the register of the CAN communication control unit 330 to become available and adjusting the timing. The CAN message handling unit 312 writes a plurality of CAN messages in the register of the CAN communication control unit 330 when a plurality of CAN messages is stored in the CAN message buffer 311. And, the CAN communication control unit 330 reads the CAN message from the register via interruption for a transmission request from the CAN message handling unit 312, and transmits such CAN message as the CAN frame to the CAN transmission channel 4 according to the CAN protocol.

As a result of adopting the foregoing configuration, the following effects can be obtained. As a result of separating the communication tasks having different task scheduling systems as the event-driven type and time-trigged type from the processors that execute the application tasks, deterioration in the reliability caused by the collision of priorities resulting from the differences of both systems can be avoided. Specifically, it will be possible to configure a highly reliable control system having a dispersive network under an execution environment containing non-equivalent activation processing and equivalent activation communication processing, which are tasks of high priority. Further, the existing system may be employed as is upon applying a time-division multiplex fixed schedule communication system between the nodes of a control system based on an existing event-driven task activation system in order to improve the transmission rate and transmission efficiency.

As a result of employing an existing communication protocol such as CAN for the connection of devices in the application node and minimizing the number of nodes to be connected to the network in such application node, the transmission bandwidth to be equally provided to the application node can be expanded and the transmission delay can be reduced. For example, the transmission delay can be reduced to $\frac{1}{10}$ or less in comparison to the parallel bus to be used in connecting the number of signals between the devices on a standard board.

Further, the operation of the communication controller upon activation of the network or during malfunctions required high responsiveness is conducted with a communication processor on the same chip. Specifically, since this is conducted within the communication message conversion device, desired control can be reliably conducted with the serial communication line having a limited bandwidth even when it is connected to the device in the application node.

Since devices such as the CAN application device having the CAN controller and the communication message conversion device are connected via a serial communication line such as CAN, the number of signal lines to be used for the connection can be reduced. As a result, in addition to the effect of reducing the influence of noise, the number of pins in the package of both the device and the communication message conversion unit can be reduced, and the effect of miniaturization and reduction of production costs can be realized based on the reduction of the packaging area. This has a major impact on the control system of vehicles.

The cost required upon installing a communication processor can be suppressed in comparison to the costs required for changing and recreating the scheduling system of existing software even when it is combined with the broad bandwidth network communication controller such as FlexRay or the like. Another effect is yielded in that the uncertainty of quotes regarding the throughput and memory required can be limited at the stages of software design and hardware design. Since existing measuring equipment, software and application thereof can be used in the assessment and inspection of the communication system, the smooth succession of technical assets is possible.

Since the FlexRay frame is configured by converting the message ID of the CAN message into a short message index, in comparison to case of relaying this as is, the transmission efficiency will improve, and the transmission speed of an effective payload can be improved.

As a result of using the masking function of the acceptance filter conventionally possessed by the CAN controller, by dividing the partial space for message ID conversion, the scope of search upon conversion from the message ID to the message index can be significantly reduced, and the processing load of the communication message conversion device can be reduced.

As a result of conducting the conversion of the acceptance filter and message index against the plurality of CAN messages received as the FlexRay message frame in the message index space, direct referral in the message index is enabled, and processing for searches can be avoided, and, therefore, the load of the communication message conversion device can be significantly reduced. When considering the nature of many communication nodes in that they are subject to the processing of converting the FlexRay message into a CAN message much more than the processing of converting the CAN message into a FlexRay message, the effect of the effective reduction of the processing load of the communication message conversion device based on the asymmetry of the processing load is significant.

In the foregoing example, although a case was explained where the CAN frame was transferred with the FlexRay frame, other communication protocols may be used. For instance, instead of CAN, an event-driven protocol such as LIN (Local Interconnect Network) may be used, and a time-triggered protocol such as TTP (Time Triggered Protocol) may be used instead of FlexRay.

It is apparent that the present invention is not limited to the above embodiment and it may be modified and changed without departing from the scope and spirit of the invention.

What is claimed is:
1. A communication message conversion device, comprising:
 a first receiving unit receiving a plurality of first messages according to a first communication protocol;
 a first message storage unit storing each of the plurality of first messages received by the first receiving unit in one of a plurality of buffer areas according to a first message identifier contained in each of the plurality of first messages;

a plurality of first identifier conversion tables, each of the plurality of first identifier conversion tables including identification translation information and each of the plurality of first identifier conversion tables being provided to each of the plurality of buffer areas;

a first identifier conversion unit converting the first message identifier in each of the plurality of first messages into a second message identifier based on one of the plurality of first conversion tables associated with one of the plurality of buffer areas storing the first message;

a first message conversion table for associating a second message with a plurality of first message identifiers;

a first message conversion unit packing the plurality of first messages including the second message identifier associated with the first message conversion table into the second message; and a first transmission unit transmitting the second message converted with the first message conversion unit according to a second communication protocol, wherein each of the plurality of first messages are received with the first message identifier included therein, and wherein the first message storage unit stores the received first message in one of a plurality of buffer areas when the first message identifier is of a predetermined value, and the first identifier conversion table contains the second message identifier of a number corresponding to the predetermined value.

2. A communication message conversion device according to claim 1, wherein the space of the second message identifier is smaller than the space of the first message identifier.

3. A communication message conversion device according to claim 1, wherein the first communication protocol is an event-driven protocol, and the second communication protocol is a time-trigger communication protocol.

4. A communication message conversion device according to claim 1, wherein the first communication protocol is Controller Area Network (CAN), and the second communication protocol is FlexRay.

5. A communication message conversion device according to claim 1, wherein the first receiving unit receives the first message from a first communication device communicating in accordance with the first communication protocol.

6. A communication message conversion device according to claim 5 which communicates with the first communication device one on one.

7. A communication message conversion device, comprising:

a second receiving unit receiving a second message containing a plurality of first messages, according to a second communication protocol;

a second message conversion unit unpacking the second message received by the second receiving unit and converting the unpacked second message into a plurality of first messages;

a second identifier conversion unit converting a second message identifier contained in and received with each first message converted with the second message conversion unit into a first message identifier;

a second message conversion table including correspondence information between the second message identifier and one of a plurality of buffer areas and correspondence information between a different second message identifier and another one of the plurality of buffer areas;

a second message storage unit storing the first message converted with the second message conversion unit in one of a plurality of buffer areas according to the second message identifier contained in the received first message based on the second message conversion table; and a second transmission unit transmitting the first message stored in the second message storage unit according to a first communication protocol, wherein the second message storage unit stores the converted first message in the one of the plurality of buffer areas when the second message identifier is of a predetermined value, and the second message conversion table contains the second message identifier of a number corresponding to the predetermined value.

8. A communication message conversion device according to claim 7, further comprising a second identifier conversion table in which first message identifiers corresponding to the second message identifier are aligned in the order of the second message identifier, wherein the second identifier conversion unit converts the second message identifier into an associated first identifier by directly referring to the second identifier conversion table with the second identifier.

9. A communication message conversion device according to claim 7, wherein an area of the second message identifier is smaller than an area of the first message identifier.

10. A communication message conversion device according to claim 7, wherein the first communication protocol is an event-driven protocol, and the second communication protocol is a time-trigger communication protocol.

11. A communication message conversion device according to claim 7, wherein the first communication protocol is Controller Area Network (CAN), and the second communication protocol is FlexRay.

12. A communication message conversion device according to claim 7, wherein the second transmission unit transmits the first message to a first communication device communicating in accordance with the first communication protocol.

13. A communication message conversion device according to claim 12 which communicates with the first communication device one on one.

14. A communication system comprising first and second communication message conversion devices that mutually communicate according to a second communication protocol, wherein the first communication message conversion device comprises:

a first receiving unit receiving a plurality of first messages according to a first communication protocol;

a first message storage unit storing each of the plurality of first messages received by the first receiving unit in one of a plurality of buffer areas according to a first message identifier contained in each of the plurality of first messages;

a plurality of first identifier conversion tables, each of the plurality of first identifier conversion tables including identification translation information and each of the plurality of first identifier conversion tables being provided to each of the plurality of buffer areas;

a first identifier conversion unit converting the first message identifier in each of the plurality of first messages into a second message identifier using one of the plurality of first conversion tables associated with one of the plurality of buffer areas storing the first message identifier;

a first message conversion table for associating a second message with a plurality of first message identifiers;

a first message conversion unit packing the plurality of first messages including the second message identifier associated with the first message conversion table into the second message; and a first transmission unit transmitting the second message converted with the first message conversion unit according to a second communication protocol; and wherein the second communication message conversion device comprises:

a second receiving unit receiving a second message transmitted by the first communication message conversion device according to the second communication protocol;

a second message conversion unit unpacking the second message received by the second receiving unit and converting the unpacked second message into a plurality of first messages;

a second identifier conversion unit converting the second message identifier contained in the first message converted with the second message conversion unit into a first message identifier;

a second message storage unit storing the first message converted with the second message conversion unit in one of a plurality of buffer areas according to the second message identifier contained in the received first message; and a second transmission unit transmitting the first message stored in the second message storage unit according to a first communication protocol, wherein the first receiving unit receives each of the plurality of first messages with the first message identifier included therein, and wherein the first message storage unit stores the received first message in one of a plurality of buffer areas when the first message identifier is of a predetermined value, and the first identifier conversion table contains the second message identifier of a number corresponding to the predetermined value.

* * * * *